US009238224B2

(12) United States Patent
Washizu et al.

(10) Patent No.: US 9,238,224 B2
(45) Date of Patent: Jan. 19, 2016

(54) MICROCHIP (75) Inventors: Takashi Washizu, Hino (JP); Hiroshi Hirayama, Musashino (JP)

(73) Assignees: Konica Minolta, Inc., Tokyo (JP); Wako Pure Chemical Industries, Ltd., Osaka (JP)

( * ) Notice: Subject to any disclaimer, the term of this patent is extended or adjusted under 35 U.S.C. 154(b) by 408 days.

(21) Appl. No.: 13/320,214

(22) PCT Filed: Mar. 5, 2010

(86) PCT No.: PCT/JP2010/053638
§ 371 (c)(1),
(2), (4) Date: Nov. 11, 2011

(87) PCT Pub. No.: WO2010/131514
PCT Pub. Date: Nov. 18, 2010

(65) Prior Publication Data
US 2012/0052240 A1 Mar. 1, 2012

(30) Foreign Application Priority Data
May 15, 2009 (JP) .................................. 2009-118453

(51) Int. Cl.
*B32B 3/02* (2006.01)
*B32B 3/24* (2006.01)
(Continued)

(52) U.S. Cl.
CPC ..... *B01L 3/502707* (2013.01); *B01L 3/502715* (2013.01); *B29C 66/112* (2013.01);
(Continued)

(58) Field of Classification Search
None
See application file for complete search history.

(56) References Cited

U.S. PATENT DOCUMENTS 4,824,247 A * 4/1989 True ....................... A61B 10/00
356/244
4,902,624 A * 2/1990 Columbus ............ B01J 19/0046
356/246
(Continued)

FOREIGN PATENT DOCUMENTS

CN 1809421 7/2006
JP 2002-521222 7/2002
(Continued)

OTHER PUBLICATIONS

Machine Translation of JP 2006349347 A, Dec. 2006.*
(Continued)

*Primary Examiner* — Jeff Vonch
(74) *Attorney, Agent, or Firm* — Cozen O'Connor (57) ABSTRACT

A flow path groove is formed in the surface of at least one of two resin substrates; the two resin substrates are joined with the surface in which the flow path groove is formed facing inward; a through-hole having a substantially round cross section is formed in either one of the two resin substrates such that the through-hole connects with the flow path groove from the surface opposite the surface where the two resin substrates join; protruding parts, which protrude in the direction of thickness of the resin substrates and are disposed enclosing the through-hole, are formed in the surface on the opposite side; a space, which has a substantially round cross-sectional shape concentric with the through-hole and has depth in the same direction as the direction of thickness of the resin substrates, is formed in the joined surfaces when the protruding parts are projected from the direction substantially perpendicular to the joined surfaces; and the correlation of fc>fa is satisfied when the edges on the base end side of the through-hole are projected onto the joined surfaces from a substantially perpendicular direction, where the diameter on the base end side of the through-hole is fa and the diameter on the end edge side of the space touching the joined surfaces is fc.

5 Claims, 7 Drawing Sheets

(51) Int. Cl.
  *B32B 3/30* (2006.01)
  *B01L 3/00* (2006.01)
  *B29C 65/00* (2006.01)
  *B32B 37/00* (2006.01)
  *B32B 3/26* (2006.01)
  *B32B 7/04* (2006.01)
  *B29C 65/06* (2006.01)
  *B29C 65/08* (2006.01)
  *B29C 65/10* (2006.01)
  *B29C 65/16* (2006.01)
  *B29C 65/18* (2006.01)
  *B29C 65/20* (2006.01)
  *B29C 65/48* (2006.01)
  *B29L 31/00* (2006.01)

(52) U.S. Cl.
  CPC ........... *B29C66/131* (2013.01); *B29C 66/5346* (2013.01); *B29C 66/7352* (2013.01); *B01L 2200/027* (2013.01); *B01L 2200/0689* (2013.01); *B01L 2300/042* (2013.01); *B01L 2300/0816* (2013.01); *B01L 2300/0877* (2013.01); *B01L 2300/0887* (2013.01); *B29C 65/06* (2013.01); *B29C 65/08* (2013.01); *B29C 65/10* (2013.01); *B29C 65/16* (2013.01); *B29C 65/18* (2013.01); *B29C 65/20* (2013.01); *B29C 65/48* (2013.01); *B29C 65/4895* (2013.01); *B29C 66/71* (2013.01); *B29C 66/73921* (2013.01); *B29L 2031/756* (2013.01); *B32B 3/26* (2013.01); *B32B 3/263* (2013.01); *B32B 3/266* (2013.01); *B32B 3/30* (2013.01); *B32B 7/04* (2013.01); *Y10T 428/24289* (2015.01)

(56) References Cited

U.S. PATENT DOCUMENTS

| | | | | |
|---|---|---|---|---|
| 5,100,626 | A * | 3/1992 | Levin | G01N 33/54366 422/420 |
| 5,223,219 | A * | 6/1993 | Subramanian | B01L 3/5027 210/451 |
| 5,302,348 | A * | 4/1994 | Cusack | G01N 33/4905 422/534 |
| 5,364,744 | A * | 11/1994 | Buican | B29C 35/08 264/482 |
| 5,725,831 | A * | 3/1998 | Reichler et al. | 422/417 |
| 5,783,148 | A * | 7/1998 | Cottingham | B01L 3/50273 422/417 |
| 5,890,745 | A | 4/1999 | Kovacs | |
| 5,948,695 | A * | 9/1999 | Douglas | B01L 3/5023 422/401 |
| 6,322,683 | B1 * | 11/2001 | Wolk et al. | 204/600 |
| 6,406,672 | B1 * | 6/2002 | Bhullar et al. | 422/73 |
| 6,627,406 | B1 * | 9/2003 | Singh | B01J 19/16 422/50 |
| 6,644,944 | B2 * | 11/2003 | Karp | F04B 43/043 137/859 |
| 6,878,255 | B1 * | 4/2005 | Wang | G01N 27/44791 204/451 |
| 7,217,396 | B2 * | 5/2007 | Liu | B01L 3/0241 422/503 |
| 7,497,994 | B2 * | 3/2009 | Gandhi | B01L 3/5085 422/504 |
| 7,569,127 | B1 * | 8/2009 | Cho | B01L 3/502715 137/814 |
| 7,595,871 | B2 * | 9/2009 | Weber | B01L 3/5025 356/246 |
| 8,231,845 | B2 * | 7/2012 | Wyzgol | B01L 3/502746 422/412 |
| 8,404,193 | B2 * | 3/2013 | Sekihara | B29C 45/2628 156/245 |
| 8,665,578 | B2 * | 3/2014 | Pelrine | H02N 13/00 361/234 |
| 2002/0037499 | A1 * | 3/2002 | Quake | B01F 5/0646 435/6.13 |
| 2002/0043801 | A1 * | 4/2002 | Ogawa | B01J 19/0093 285/133.11 |
| 2002/0100714 | A1 * | 8/2002 | Staats | B01L 3/5027 210/85 |
| 2003/0082632 | A1 * | 5/2003 | Shumate | 435/7.1 |
| 2003/0190265 | A1 * | 10/2003 | Anazawa | B01J 19/0093 422/537 |
| 2003/0206832 | A1 * | 11/2003 | Thiebaud et al. | 422/100 |
| 2003/0226604 | A1 * | 12/2003 | Schlautmann | B01L 3/502707 137/827 |
| 2004/0017078 | A1 * | 1/2004 | Karp | B81B 7/00 285/136.1 |
| 2004/0047768 | A1 * | 3/2004 | Sullivan | B01L 3/5025 73/64.56 |
| 2004/0115679 | A1 * | 6/2004 | Tanioka | B01L 3/5027 435/6.13 |
| 2004/0202994 | A1 * | 10/2004 | Timperman | B01D 57/02 435/4 |
| 2004/0241051 | A1 * | 12/2004 | Wyzgol et al. | 422/100 |
| 2004/0265182 | A1 | 12/2004 | Chen et al. | |
| 2005/0019231 | A1 * | 1/2005 | Kahl | B01L 3/5027 422/187 |
| 2005/0112036 | A1 * | 5/2005 | Funazaki | B01J 19/0093 422/130 |
| 2005/0229696 | A1 * | 10/2005 | Takayama | B01F 5/0646 73/204.26 |
| 2005/0255003 | A1 * | 11/2005 | Summersgill | B01F 5/0646 422/606 |
| 2005/0277185 | A1 * | 12/2005 | Levin | B01L 3/5025 435/287.1 |
| 2006/0044563 | A1 * | 3/2006 | Fujikura | B01L 3/502715 356/445 |
| 2006/0154361 | A1 * | 7/2006 | Wikswo | B01L 3/502746 435/289.1 |
| 2007/0078358 | A1 * | 4/2007 | Escutia et al. | 600/573 |
| 2007/0172389 | A1 * | 7/2007 | Wilding et al. | 422/58 |
| 2008/0041722 | A1 * | 2/2008 | Ormos | B01F 13/0076 204/451 |
| 2008/0305537 | A1 * | 12/2008 | Sato | B01J 19/0046 435/287.2 |
| 2009/0214392 | A1 * | 8/2009 | Kameoka | B01L 3/502761 422/400 |
| 2009/0250345 | A1 * | 10/2009 | Powell | B01D 57/02 204/456 |
| 2011/0135538 | A1 * | 6/2011 | Goshima | B01L 3/502707 422/68.1 |
| 2011/0300034 | A1 * | 12/2011 | Mair et al. | 422/502 |
| 2013/0098481 | A1 * | 4/2013 | Delamarche | B01L 3/502715 137/561 A |
| 2013/0269452 | A1 * | 10/2013 | Cauley, III | G01N 1/00 73/864.91 |
| 2013/0319534 | A1 * | 12/2013 | Ogura | B01L 3/502715 137/1 |

FOREIGN PATENT DOCUMENTS

| | | | |
|---|---|---|---|
| JP | 2003-121311 | | 4/2003 |
| JP | 2003215136 A | * | 7/2003 |
| JP | 2006-234600 | | 9/2006 |
| JP | 2006349347 A | * | 12/2006 |
| JP | 2008232655 A | * | 10/2008 |
| WO | WO 2008/042482 | | 4/2008 |
| WO | WO 2009130977 A1 | * | 10/2009 ........ B01L 3/502715 |

OTHER PUBLICATIONS

Office Action issued by the SIPO and an English translation.
Office Action dated Feb. 28, 2015 which issued in the corresponding Chinese Patent Application No. 201080020713.4.

* cited by examiner

REPRODUCIBILITY TEST

| | SPACE FORMING PORTION | SPACE DIAMETER | REPRODUCIBILITY TEST | REMARKS |
|---|---|---|---|---|
| COMPARATIVE EXAMPLE 1 | — | $\phi a$ | D | DUE TO INADEQUATE JOINING |
| EXAMPLE 1 | SUBSTRATE 10 | $\phi a+(\phi b-\phi a)/4 \cdots a<c<b$ | B | MORE IMPROVED THAN COMPARATIVE EXAMPLE |
| EXAMPLE 2 | SUBSTRATE 10 | $\phi b \cdots c=b$ | A | |
| EXAMPLE 3 | SUBSTRATE 10 | $\phi 2b \cdots c>b$ | A | |
| EXAMPLE 4 | SUBSTRATE 10 | $\phi 2.5b \cdots c>b$ | B | CRACK OCCURRENCE IN THE ROOT OF THE PROTRUSION ON JOINING |
| EXAMPLE 5 | SUBSTRATE 10 | $\phi a+(\phi b-\phi a)/2 \cdots a<c<b$ | A | |
| EXAMPLE 6 | SUBSTRATE 20 | $\phi b \cdots c=b$ | A | |

PROTRUSION STRENGTH TEST

| | SPACE FORMING PORTION | SPACE DIAMETER | REPRODUCIBILITY TEST |
|---|---|---|---|
| EXAMPLE 1 | SUBSTRATE 10 | $\phi a+(\phi b-\phi a)/4 \cdots a<c<b$ | A |
| EXAMPLE 2 | SUBSTRATE 10 | $\phi b \cdots c=b$ | A |
| EXAMPLE 3 | SUBSTRATE 10 | $\phi 2b \cdots c>b$ | B |
| EXAMPLE 4 | SUBSTRATE 10 | $\phi 2.5b \cdots c>b$ | C |
| EXAMPLE 5 | SUBSTRATE 10 | $\phi a+(\phi b-\phi a)/2 \cdots a<c<b$ | A |
| EXAMPLE 6 | SUBSTRATE 20 | $\phi b \cdots c=b$ | A |

| | TYPE 1 | TYPE 2 | TYPE 3 | TYPE 4 |
|---|---|---|---|---|
| $a<c<b$ | | | | |
| $c=b$ | | | | |
| $c>b$ | | | | |

MICROCHIP

This application is a U.S. National Phase Application under 35 USC 371 of International Application PCT/JP2010/053638 filed on Mar. 5, 2010.

This application claims the priority of Japanese application no. 2009-118453 filed May 15, 2009, the entire content of which is hereby incorporated by reference.

TECHNICAL FIELD

The present invention relates to a joined microchip, and specifically to a microchip having a three-dimensional structure in one of two resin substrates.

BACKGROUND

There have been brought into practical use devices referred to as microanalysis chips or µ-TAS's (Micro Total Analysis Systems), in which using microfabrication technology, a micro-flow channel and a circuit are formed in silicone or a glass substrate to carry out chemical reaction, separation, or analysis of a liquid sample such as nucleic acid, protein, or blood in a micro space. It is conceivable that these microchips have such advantages that the used amount of a sample or a reagent or the discharge amount of waste liquid is reduced, and small-foot print, portable, and inexpensive systems are realized.

Microchips are produced in such a manner that two members, in which at least one member thereof having been subjected to microfabrication, are bonded together. Conventionally, for microchips, glass substrates are used and various microfabrication methods have been proposed. However, such glass substrates are unsuitable for mass production and exhibit extremely high cost. Therefore, the development of resin microchips, which are inexpensive and disposable, has been desired.

To produce a resin microchip, a resin substrate having a flow channel groove in the surface and a resin substrate to cover the flow channel groove are joined. Such a resin substrate having a flow channel groove is produce by a method such as an injection molding method, a press molding method, or a mechanical working method. Then, a resin substrate having a flow channel groove in the surface and a resin substrate for covering are joined together in which the flow channel groove is placed inward. Via this joining, the resin substrate for covering functions as the lid (the cover) of the flow channel groove and then a micro-flow channel is formed by the flow channel groove. Thereby, a microchip having such a micro-flow channel groove in the interior is produced. In joining of resin substrates together, there are listed a welding method to pressure-join resin substrates by heating using a heating plate, hot air, a heating roll, ultrasound, vibration, or a laser, an adhesion method to join resin substrates using an adhesive or a solvent; a joining method utilizing adhesion properties of resin substrates themselves; and a method to join substrates themselves via surface treatment such as plasma treatment for the resin substrates.

Further, in a resin substrate having a flow channel groove, a through-hole, which penetrates in the thickness direction of the resin substrate, is formed. This through-hole is connected to the flow channel groove. Still further, a resin substrate having a flow channel groove is provided with a cylindrical protrusion surrounding a through-hole in the surface of the opposite side to the surface where the flow channel groove is formed (for example, Patent Document 1). This protrusion is fitted with a tube or a nozzle to introduce a liquid sample into the flow channel groove or to discharge the liquid sample from the flow channel groove.

Figure 7A:
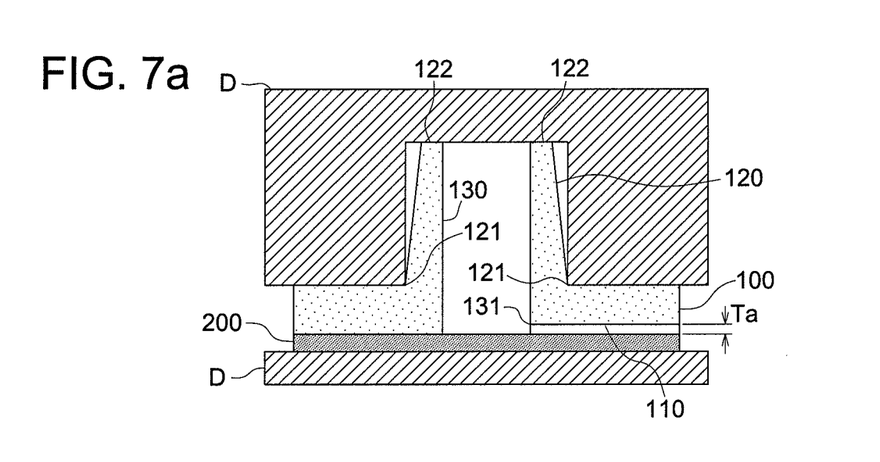
FIG. 7 is a cross-sectional view of a production apparatus of a microchip according to a conventional example.

As shown in FIG. 7, when two resin substrates 100 and 200 (hereinafter, referred to as "substrates") are joined using any of the above methods, a jig D to nip the 2 substrates 100 and 200 is used. Two substrates 100 and 200 nipped by a jig D is shown in FIG. 7a. When such 2 substrates 100 and 200 are joined, the entire surface of the substrates 100 and 200 to be brought into contact with a jig D needs to make contact with the jig D uniformly.

PRIOR ART DOCUMENT

Patent Document

Patent Document 1: Unexamined Japanese Patent Application Publication No. 2006-234600

BRIEF DESCRIPTION OF THE INVENTION

Problems to be Solved by the Invention

When 2 flat substrates are nipped by a jig, the entire face of the substrates to be brought into contact with the jig is relatively easily allowed to make contact with the jig uniformly. However, as shown in FIG. 7a, when one substrate 100 has a three-dimensional structure such as a protrusion 120, there has been noted such a problem that it is difficult that a jig D is allowed to make contact with the upper face 122 of the protrusion 120 uniformly in the same manner as in the faces of other flat portions. For example, when a jig D is machined to provide a three-dimensional structure, there is generated a machining dimension error of about several tens µm with respect to the design value between the actual dimension of the jig D making contact with the upper face 122 of a protrusion 120 and the actual dimension of the jig D making contact with the lower portion 121 of the protrusion 120. When using a jig D having such a machining dimension error, 2 substrates 100 and 200 are nipped, it is occurred the case where the jig D strongly makes contact with the upper face 122 of the protrusion 120 and weakly makes contact with the faces of other flat portions, whereby the pressure P applied to the protrusion 120 exceeds a predetermined value or, in contrast, the case where the jig D weakly makes contact with the upper face 122 of the protrusion 120 and strongly makes contact with the faces of other flat portions, whereby the pressure P applied to the protrusion 120 falls short of a predetermined value.

Figure 7B:
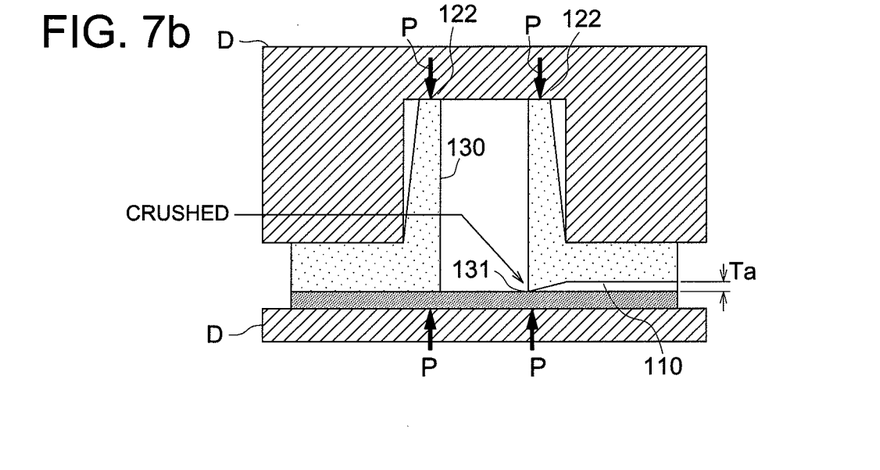
Figure 7C:
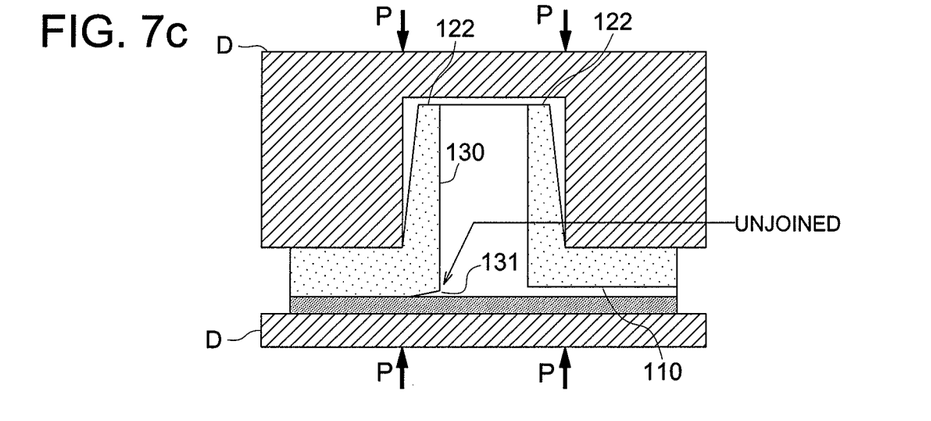

Further, there has been noted such a problem that when the pressure applied to the protrusion 120 exceeds a predetermined value, the base end side edge 131 of a through-hole 130 is deformed; a flow channel groove 110 having depth Ta is crushed; and then 2 substrates 100 and 200 are joined with the crushed flow channel groove 110. A crushed flow channel groove 110 is shown in FIG. 7b. In contrast, there has been such a problem that when the force applied to the upper face 122 of the protrusion 120 falls short of the predetermined force, an unjoined portion is generated in the periphery of the base end side edge 131 of the through-hole 130 (immediately below the protrusion 120). An unjoined portion generated in the periphery of the base end side edge 131 of the through-hole 130 is shown in FIG. 7c.

In a test such as chemical reaction of the above liquid sample, as described above, when a microchip in which 2 substrates 100 and 200 have been joined with a crushed flow channel groove 110 or a microchip in which an unjoined portion has been generated in the periphery of the base end side edge 131 of a through-hole 130 is used, the same result is not always obtained from the same sample and conditions, resulting in decreased reproducibility.

The present invention is to solve the above problems and an object thereof is to provide a microchip exhibiting excellent reproducibility.

Means to Solve the Problems

To solve the above problems, a first embodiment of this invention is a microchip in which a flow channel groove is formed in a surface of at least one of two resin substrates; the two resin substrates are joined with a face facing inward where the flow channel groove is formed; in at least either one of the two resin substrates, a through-hole of an almost circularly cross-sectional shape leading to the flow channel groove from a face of an opposite side to the face where the two resin substrates are joined is formed; and in the face of the opposite side, a protrusion protruding in a thickness direction of the resin substrate provided so as to surround the through-hole is formed, wherein the microchip in which a space having an almost circularly cross-sectional shape concentric with the through hole and a depth in the same direction as the thickness direction of the resin substrate is formed on a joint face of one of the two resin substrates or the other resin substrate which is the joint face in the case where the protrusion is projected from an almost perpendicular direction to the joint face, and when a base end side edge of the through-hole is projected on the joint face from the almost perpendicular direction, a relationship of $\phi c > \phi a$ is satisfied, provided that a diameter of the base end side of the through-hole is designated as $\phi a$ and a diameter of an end edge side of the space making contact with the joint face is designated as $\phi c$.

A second embodiment of this invention is a microchip according to the first embodiment, having a feature that a relationship of $2.5 \times \phi b > \phi c$ is satisfied, provided that the diameter of the base end side of the protrusion in the case where the base end of the protrusion is projected on the joint face from the almost perpendicular direction is designated as $\phi b$.

A third embodiment of this invention is a microchip according to the second embodiment, having a feature that a relationship of $\phi b \geq \phi c$ is satisfied.

A fourth embodiment of this invention is a microchip according to any of the first-third embodiments, having a feature that the space is formed in the joint face of the resin substrates in which the flow channel groove has been formed in one of the two resin substrates and the space has a depth so as for a clearance to remain between the base end side edge of the through-hole and the joint face even when the two resin substrates is joined.

A fifth embodiment of this invention is a microchip according to the fourth embodiment, having a feature that the relationship of $Ta \leq Tc \leq T/2$ is satisfied, provided that the depth of the space designated as Tc, the thickness of the resin substrate designated as T, and the depth of the flow channel groove are designated as Ta, respectively.

A sixth embodiment of this invention is a microchip according to the fourth embodiment, having a feature that the space has a peripheral wall face slanting from the end edge side of the space toward the base end side edge of the through-hole.

A seventh embodiment of this invention is a microchip according to the fourth embodiment, having a feature that the space has a peripheral wall face slanting from the end edge side of the space toward a tip side edge of the through-hole.

Effects of the Invention

The first embodiment of this invention makes it possible that in the case where one resin substrate has a protrusion, when substrates are joined together, a flow channel groove is maintained to have a desired shape; an unjoined portion is prevented from occurring; and reproducibility is enhanced.

The second and third embodiments of this invention make it possible that reproducibility is further enhanced.

The fourth embodiment of this invention makes it possible that when substrates are joined together, a flow channel groove is maintained to have a predetermined shape.

The fifth-seventh embodiments of this invention make it possible that when substrates are joined together, a flow channel groove is further maintained to have a predetermined shape.

PREFERRED EMBODIMENTS OF THE INVENTION

First Embodiment

The microchip according to the first embodiment of this invention will now be described with reference to FIG. 1 and FIG. 2. FIGS. 1a-1c are cross-sectional views in the case where the microchip according to the first embodiment of this invention is cut along the center of a through-hole. FIG. 2a is a cross-sectional view of a production apparatus of a microchip; FIG. 2b of a b-b line cross-sectional view in the case A; and FIG. 2c is a c-c line cross-sectional view in the case A.

The microchip of this embodiment incorporates a resin substrate 10 and a resin substrate 20. In the surface of the resin substrate 10, a flow channel groove 11 is formed. Further, the resin substrate 20 serving as the joint counterpart of the resin substrate 10 is a flat plate substrate, and those having a sheet shape or a film shape are used. Then, the face where the flow channel groove 11 is formed is placed inward to join the resin substrate 10 and the resin substrate 20. Thereby, the resin substrate 20 functions as the lid (the cover) of the flow channel groove 11 and then a micro-flow channel is formed by the flow channel groove 11 to produce a microchip having a micro-flow channel in the interior formed by a flow channel groove 11.

In the resin substrate 10, a through-hole 13 penetrating in the thickness direction of the substrate is formed. This through-hole 13 makes contact with the flow channel groove 11 and leads to the flow channel groove 11 from the face of the opposite side to the joint face of the resin substrate 10 and the resin substrate 20. Herein, "the joint face" refers to at least either of the face of a resin substrate 10 in which a flow channel groove 11 is formed and the face of a resin substrate 20 joined to the face of the resin substrate 10. When the resin substrate 10 and the resin substrate 20 are joined, an opening to connect the flow channel groove to the outside is formed. Since the through-hole 13 leads to the flow channel groove 11, the opening formed by the through-hole 13 leads to the micro-flow channel. The opening (the through-hole 13) is a hole to introduce, store, and discharge gel, a liquid sample, or a buffer solution. The opening (the through-hole 13) is connected to a tube or nozzle provided for an analyzer and then via the tube or nozzle, gel, a liquid sample, or a buffer solution is introduced into the micro-flow channel or discharged from the flow channel groove 11.

Further, in the resin substrate 10, in the surface of the opposite side to the surface where a flow channel groove 11 is formed, a concavo-convex member is provided. For example, as shown in FIG. 1a, the resin substrate 10 is provided with a protrusion 12 of a circular truncated cone shape in the surface of the opposite side to the surface where a flow channel groove 11 is formed. This protrusion 12 is protruded in the thickness direction of the resin substrate 10 and provided so as to surround the through-hole 13. Herein, a protrusion 12 is provided integrally with the resin substrate 10 but may be molded as a separate member to be joined to the resin substrate 10. This protrusion 12 is fitted with a tube or nozzle to introduce or discharge a liquid sample. Incidentally, the cross-sectional shape of the protrusion 12 shown in FIG. 1a is a circular truncated cone, which is just one example, and may be a cylinder, rectangular cylinder, circular truncated cone, or truncated pyramid.

The outline shape of the resin substrate 10 needs only to be a shape which is easy to handle and analyze, being preferably square or rectangular. As one example, a size of 10 mm square-200 mm square is employable. Further, a size of 10 mm square-100 mm square is employable. The inner diameter of the through-hole 13 needs only to be suitable for the analysis method and the analyzer and to be, for example, about 2 mm.

With regard to the shape of a micro-flow channel, in view of the reduction of the used amount of an analysis sample and a reagent, the production accuracy of a molding die, transfer performance, and releasability, both the width and the depth preferably fall within the range of 10 μm-200 μm, being, however, not specifically limited. Further, the width and the depth of the flow channel groove 11 need only to be determined depending on the intended use of a microchip. Herein, the shape of the cross-section of the flow channel groove 11 may be a rectangular shape or a curved surface.

The plate thickness of the of the resin substrate 10 in which a flow channel groove 11 has been formed is preferably 0.2 mm-5 mm, more preferably 0.5 mm-2 mm in view of moldability. The plate thickness of the resin substrate 20 functioning as the lid (the cover) to cover the flow channel groove 11 is preferably 0.2 mm-5 mm, more preferably 0.5 mm-2 mm in view of moldability. Further, when no flow channel groove 11 is formed in the resin substrate 20 functioning as the lid (the cover), instead of the plate member, a film (a sheet member) is usable. In this case, the thickness of the film is preferably 30 μm-300 μm, more preferably 50 μm-150 μm.

In this embodiment, the outer diameter of the protrusion 12 is gradually decreased toward the opening direction of the through-hole 13. The tipmost portion of the protrusion 12 has a flat face. Further, the diameter of the through-hole 13 is constant in the height direction of the protrusion 12. The base end 12a of the protrusion 12 and the base end side edge 13a of the through-hole 13 are shown in FIG. 1a and FIG. 2.

The diameter of the base end side edge 13a side of the through-hole 13 in the case where the base end side edge 13a of the through-hole 13 is projected on the joint face from the direction perpendicular to the joint face is designated as φa. Further, the diameter of the base end 12a side of the protrusion 12 in the case where the base end 12a of the protrusion 12 is projected on the joint face from the direction perpendicular to the joint face is designated as φb. The base end side edge 13b of the through-hole 13 when projected and the base end 12b of the protrusion 12 when projected are shown in FIG. 1a.

The through-hole 13 serving as an injection hole is a liquid accumulating section to feed an electrophoresis buffer solution, a migration liquid containing a separation medium such as a molecular sieving polymer, and a sample liquid containing an analysis substance, and at least one hole needs to be formed so as to penetrate in the plate thickness direction. The size of the injection hole is not specifically limited if being a size enabling to inject a migration liquid and a sample liquid. The inner diameter is set to be preferably 0.5-10 mm. more preferably 1-5 mm from the viewpoint of the injection operation.

The through-hole 13 serving as a discharging hole is a liquid accumulating section to discharge an electrophoresis buffer solution, a migration liquid containing a separation medium such as a molecular sieving polymer, and a sample liquid containing an analysis substance, and at least one hole needs to be formed so as to penetrate in the plate thickness direction or not to penetrate therein. The size of the discharging hole is not specifically limited if being a size enabling to adequately discharge a migration liquid and a sample liquid.

The inner diameter is set to be preferably 1-10 mm. more preferably 2-5 mm from the viewpoint of the injection operation.

A space 14 having an almost circularly cross-sectional shape concentric with the through-hole 13 and a depth in the same direction as the thickness direction of a resin substrate 10 is formed in the join face in the case where the base end 12a of the protrusion 12 is projected on the joint face from the direction almost perpendicular to the face where two resin substrates 10 and 20 are joined. Herein, the space 14 needs only to be provided in at least either of the joint face of the resin substrate 10 side and the joint face of the resin substrate 20 side. A space 14 having been formed in the joint face of the resin substrate 10 side, the end edge 14a of the space 14 making contact with the joint face, and the diameter φc of the end edge 14a side of the space 14 are shown in FIG. 1a.

The diameter of φc of the end edge 14a side of the space 14 is not specifically limited if the relationship of φb>φb is satisfied. The relationship of 2.5×φb>φc is preferably satisfied and the relationship of φb≥φc is more preferably satisfied. A space 14 satisfying the relationship of φb=φc is shown in FIG. 1a. A space 14 satisfying the relationship of 2.5×φb>φc>φb is shown in FIG. 1b. A space satisfying the relationship of φb>φc>φa is shown in FIG. 1c.

Even when two resin substrates 10 and 20 have been joined, the space 14 has a depth so as for a clearance to remain between the base end side edge 13a of the through-hole 13 and the joint face. When the deformation amount (the deformation amount of the plate thickness direction of a resin substrate) of the base end side edge 13a of the through-hole 13 in the case where joining has been carried out is designated as δ and the depth of the space 14 is designated as Tc, the depth Tc of the space 14 is not specifically limited if the relationship of Tc>δ is satisfied. However, when the plate thickness of the resin substrate 10 is designated as T and the depth of the flow channel groove 11 is designated as Ta, the relationship of Ta≤Tc≤T/2 is preferably satisfied from the viewpoint of prevention of the strength decrease of the protrusion 12. The relationship of Ta=Tc is more preferably satisfied from the viewpoint of the ease of molding of the resin substrate 10.

Figure 1A:
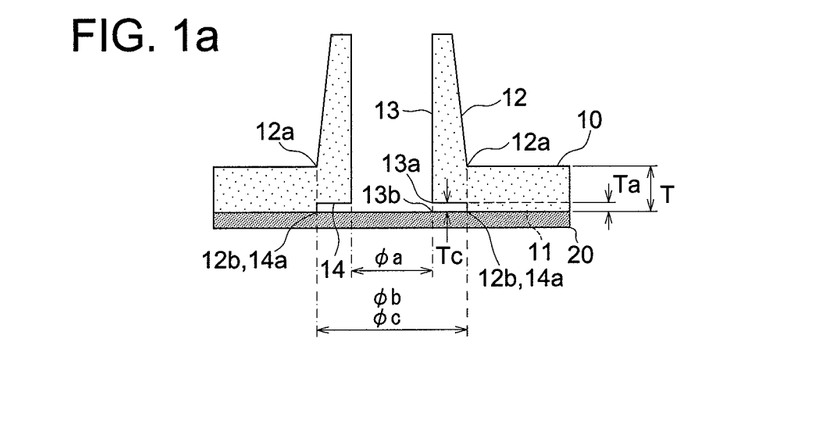
FIG. 1A is a cross-sectional view in the case where the microchip according to the first embodiment of this invention is cut along the center of a through-hole and a view in which the shapes of the spaces each are allowed to differ.

The plate thickness T of the resin substrate 10, the depth Ta of the flow channel groove 11, and the depth Tc of the space 14 are shown in FIG. 1a and FIG. 2. Herein, the depth Tc of the space 14 satisfying the above relationship is the same as in the spaces 14 each having different diameter shown in FIGS. 1b and 1c.

A material used for the resin substrates 10 and 20 needs to be a transparent or translucent material in view of detection using UV absorbance or fluorescence, being, however, not specifically limited. From the viewpoint of enhancement of reproducibility, moldable materials using a die such as cast moldable glass, thermally curable resins, or thermoplastic resins are preferable. Resin materials are more preferable from the viewpoint of insulation properties and the degree of molding. Further, since resin materials exhibit elasticity, their contact area is ensured by face pressure. Thereby, such resin materials can realize more advantageous electrical conditions than materials of glass substrates, being more preferable.

In view of productivity, for the resin substrates 10 and 20, a thermoplastic resin material is used. For the thermoplastic resin material, for example, polycarbonate, polymethyl methacrylate, polystyrene, polyacrylonitrile, polyvinyl chloride, polyethylene terephthalate, nylon 6, nylon 66, polyvinyl acetate, polyvinylidene chloride, polypropylene, polyisoprene, polyethylene, polydimethylsiloxane, and cyclic polyolefin are preferably used. Polymethyl methacrylate and cyclic polyolefin are more preferably used.

Herein, for the resin substrates 10 and the resin substrate 20, the same material may be used or different materials may be used. Further, for a resin substrate 20 in which no flow channel groove is formed, a thermally curable resin or a UV curable resin may be used, as well as a thermoplastic resin. As the thermally curable resin, polymethylsiloxane is preferably used.

A resin substrate 10 and a resin substrate 20 can be produced by a method such as an extrusion molding method, a T die molding method, an inflation molding method, a calender molding method, an injection molding method, a press molding method, or a mechanical working method. For example, using an injection molding method, a flow channel groove and a protrusion may be formed in the surface of a resin substrate, or using a mechanical molding method, a flow channel groove and a protrusion may be formed in the surface of a resin substrate.

A film-shaped resin substrate 20 used in the present embodiment is a member having an electrode (not shown), and needs to be joined to the face in which a flow channel groove 11 of a plate-shaped resin substrate 10 is formed in order to form a micro-flow channel. Herein, sample analysis via electrophoresis is assumed and then a configuration in which a film-shaped resin substrate 20 is provided with an electrode is described. Such an electrode may be provided on the side of the resin substrate 10 or a configuration in which an electrode is introduced from the through-hole 13 is employable. Further, when no sample analysis via electrophoresis is conducted, of course, no electrode may be provided.

Next, joining of a resin substrate 10 and a resin substrate 20 will be described with reference to FIG. 2. FIG. 2 is a view showing resin substrates 10 and 20 having a space 14 shown in FIG. 1a satisfying the relationship of φb=φc and a jig D.

A resin substrate 10 and a resin substrate 20 are joined by a joining method according to the conventional technique. For example, using a heating plate, hot air, a heating roll, ultrasound, vibration, or a laser, a resin substrate 10 and a resin substrate 20 are pressure-joined by heating. Alternatively, using an adhesive or solvent, a resin substrate 10 and a resin substrate 20 may be joined. However, when the flow channel diameter is varied by such an adhesive or solvent, the reproducibility of analysis is occasionally decreased, and therefor, a configuration in which pressure-joining via heating is carried out is preferable.

On joining of resin substrates 10 and 20, the base end 12a of the protrusion 12 of the resin substrate 10 is allowed to be a border, and then a jig D is brought into contact with the surface of the resin substrate 10 of the outside from the base and 12a (on the opposite side to the center of the protrusion 12). When such a manner is employed, the jig D does not make contact with the protrusion 12.

The base end 12a of a protrusion 12 serving as the border and a clearance S provided between the jig D and the upper face (the tipmost portion) of the protrusion 12 are shown in FIG. 2a. The jig D needs only to make contact with a flat face portion other than the protrusion 12. Therefore, the protrusion 12 needs not to be pressed by the jig D. Thereby, even when a working accuracy error is generated, the protrusion 12 can be prevented from deforming, and deformation of the flow channel caused by the protrusion 12 pushed in the adhesion face direction can be prevented.

In the conventional technique, since a jig D strongly makes contact with a protrusion 120, by pressure P exceeding a predetermined value applied to the protrusion 120, as shown in FIG. 7b, the deformation amount δ of the base end side edge 13a of the through-hole 130 becomes almost the same value as the depth of the flow channel groove 110, whereby it has been possible that the flow channel groove 110 is crushed. However, in this embodiment, since the jig D does not make contact with the protrusion 12, the deformation amount δ of the base end side edge 13a of the through-hole 13 can be allowed to be a minimal value with respect to the depth of the flow channel groove 11. Therefore, when resin substrates 10 and 20 are joined, the flow channel groove 11 is not crushed by such a deformed base end side edge 13a of the through-hole 13.

Further, in the conventional technique, since a jig D weakly makes contact with or makes no contact with the protrusion 120, there has been a possibility such that by pressure P falling short of a predetermined value applied to the protrusion 120, as shown in FIG. 7c, an unjoined portion is generated in the periphery of base end side edge 131 of the through-hole 130. However, in this embodiment, the presence of a space 14 makes it possible that by the pressure having been applied to the flat portion, a predetermined pressure P can also be applied to the periphery of the base end side edge 131 of the through-hole 130 by the jig D. Thereby, occurrence of an unjoined portion can be prevented.

For details, since a jig D makes contact with the base end 12a of the protrusion 12 of a resin substrate 10 so as to apply a predetermined pressure P, the base end 12b of the protrusion 12 in the case where the base end 12a of the protrusion 12 is projected on the joint face is joined to a resin substrate 20. This fact makes it possible that the diameter φb of the base end 12b side of the protrusion 12 satisfies the relationship of φb=φc with the diameter φc of the end edge 14a of the space 14. Thereby, the end edge 14a of the space 14 is joined to the resin substrate 20 and then occurrence of an unjoined portion can be prevented. The base end 12a of the protrusion 12 of a resin substrate 10 with which a jig D makes contact so as to apply a predetermined pressure P is shown in FIGS. 2b and 2c.

In the above description, joining of a resin substrate 10 having a space 14 shown in FIG. 1a satisfying the relationship of φb=φc and a resin substrate 20 has been described.

Next, description will be made on joining of a resin substrate 10 having a space 14 shown in FIG. 1b satisfying the relationship of 2.5×φb>φc and a resin substrate 20 and joining of a resin substrate 10 having a space 14 shown in FIG. 1c satisfying the relationship of φc>φa and a resin substrate 20.

Figure 1B:
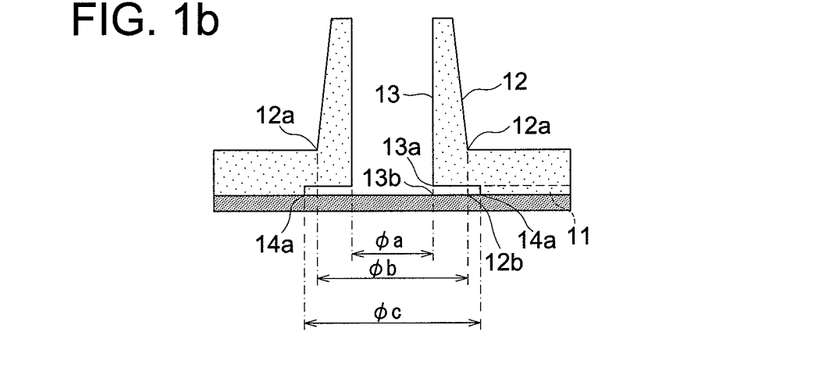
FIG. 1B is a cross-sectional view in the case where the microchip according to the first embodiment of this invention is cut along the center of a through-hole and a view in which the shapes of the spaces each are allowed to differ.
Figure 2A:
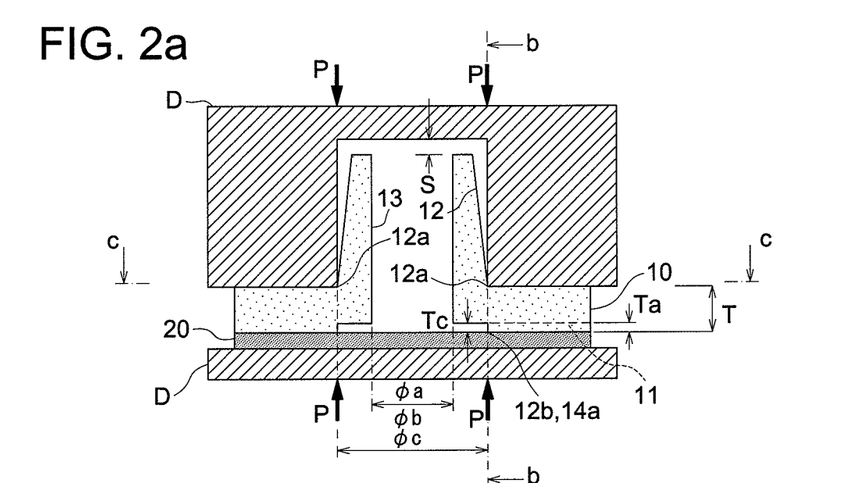
FIG. 2A is a cross-sectional view of a production apparatus of a microchip.
Figure 2B:
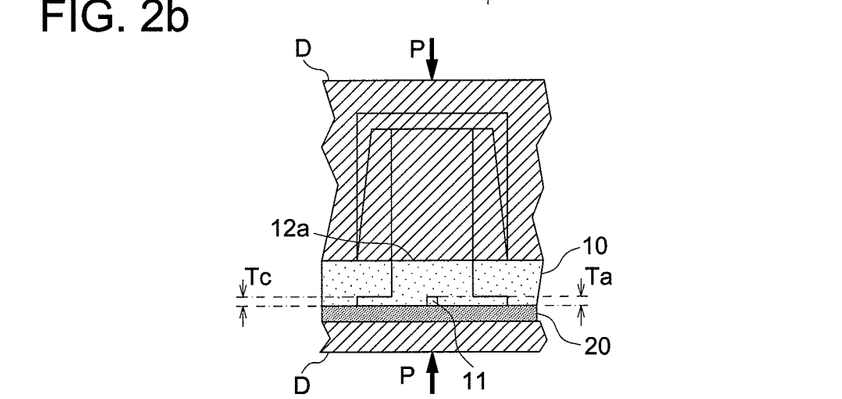
FIG. 2B of a b-b line cross-sectional view in the FIG. A.
Figure 2C:
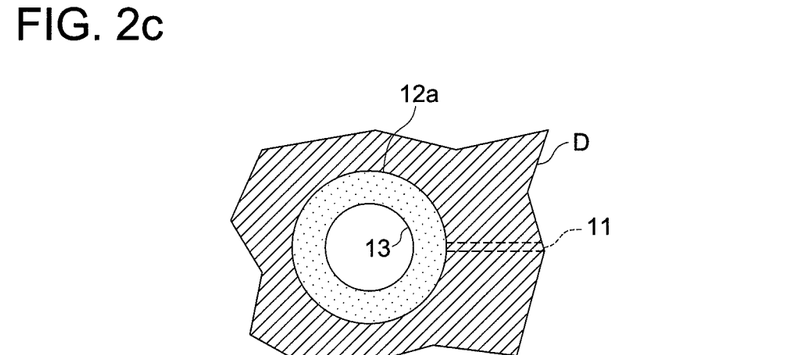
FIG. 2C is a c-c line cross-sectional view in the FIG. A.

As shown in FIG. 1b, in the case of joining of a resin substrate 10 having a space 14 satisfying the relationship of 2.5×φb>φc and a resin substrate 20, a jig D may be pressed even to the outer circumference of the base end 12a of the protrusion 12 or may be pressed so as to make contact with the surface of the resin substrate 10 corresponding to the outside from the end edge 14a of the space 14.

The end edge 14a of the space 14 is located outside the base end 12a of the protrusion 12, and thereby since pressure is adequately applied by the jig D even to the end edge 14a, the end edge 14a of the space 14 is joined to the resin substrate 20 and then occurrence of an unjoined portion can be prevented. Further, it is preferable that φc being the diameter of the end edge 14a of the space 14 be less than 2.5 times φb being the diameter of the base end side edge 13a of the through-hole 13, since even in the case where pressure is applied by the jig D even to the base end 12a of the protrusion 12, joining can be certainly carried out with no deformation of the flow channel groove 11.

Figure 1C:
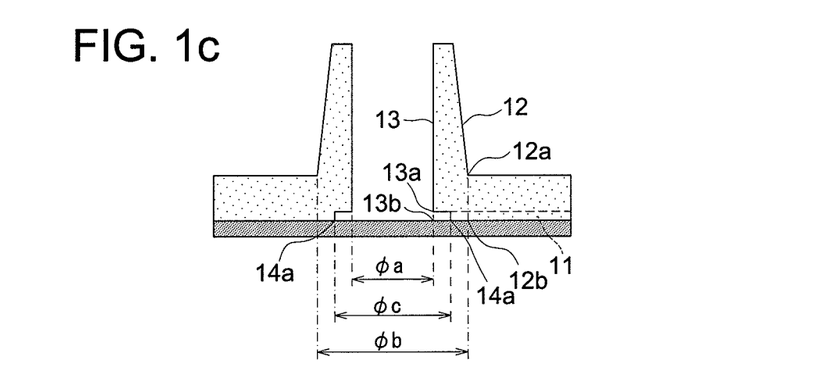
FIG. 1C is a cross-sectional view in the case where the microchip according to the first embodiment of this invention is cut along the center of a through-hole and a view in which the shapes of the spaces each are allowed to differ.

Further, in the case of joining of a resin substrate 10 having a space 14 shown in FIG. 1c satisfying the relationship of φb>φc>φa and a resin substrate 20, the relationship of a jig D and the resin substrates 10 and 20 is the same as in the case of joining of a resin substrate 10 having a space 14 shown in FIG. 1a satisfying the relationship of φb=φc and a resin substrate 20. It is preferable that the base end 12a of the protrusion 12 be allowed to be the border to bring the jig D into contact with the surface of the resin substrate 10 corresponding to the outside from the base end 12a.

The jig D makes contact with the base end 12a of the protrusion 12 so as to apply a predetermined pressure P, whereby the end edge 14a of the space 14 is also applied with at least a requisite minimum pressure. Thereby, the end edge 14a of the space 14 is joined to the resin substrate 20 and then occurrence of an unjoined portion can be prevented. In order to produce the effects of this invention, the relationship of φc>φa needs only to be satisfied. However, to certainly carry out joining ranging to the end edge 14a of the space 14, in the case of φb>φc>φa, the relationship of φc φa+(φb−φa)/2 is more preferably satisfied. This range makes it possible to apply suitable pressure to the end edge 14a of the space 14.

Second Embodiment

Figure 3A:
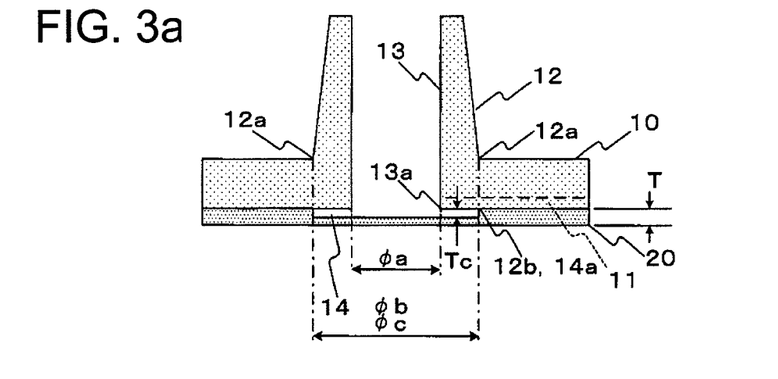
FIG. 3A is a cross-sectional view in the case where the microchip according to the second embodiment of this invention is cut along the center of a through-hole and a view in which the shapes of the spaces each are allowed to differ.

A microchip according to the second embodiment of this invention will now be described with reference to FIG. 3. FIGS. 3a-3c are cross-sectional views in the case where a microchip is cut along the center of the through-hole and views in which the shapes of the spaces each are allowed to differ.

Points in which the constitution of the microchip according to the second embodiment differs from that of the first embodiment will be mainly described. Description on the same points as in the first embodiment will be omitted. In the second embodiment, a space 14 is provided for a resin substrate 20 functioning as the lid (the cover) to cover the flow channel groove 11.

The diameter φc of the end edge 14a side of the space 14 is not specifically limited if the relationship of φc>φa is satisfied. However, the relationship of 2.5×φb>φc is preferably satisfied. The relationship of φb≥φc is more preferably satisfied. A space 14 satisfying the relationship of φb=φc is shown in FIG. 3a. A space 14 satisfying the relationship of 2.5×φb>φc>φb is shown in FIG. 3b. A space 14 satisfying the relationship of φb>φc>φa is shown in FIG. 3c.

The space 14 has a depth so as for a clearance to remain between the base end side edge 13a of the through-hole 13 and the joint face even when two resin substrates 10 and 20 have been joined. When the deformation amount (the deformation amount of the plate thickness direction of a resin substrate) of the base end side edge 13a of the through-hole 13 in the case where joining has been carried out is designated as δ and the depth of the space 14 is designated as Tc, the depth Tc of the space 14 is not specifically limited if the relationship of Tc>δ is satisfied. However, when the plate thickness of the resin substrate 20 is designated as T, the relationship of Tc≤T/2 is preferably satisfied from the viewpoint of prevention of the strength decrease of the resin substrate 20. The plate thickness T of the resin substrate 20 and the depth Tc of the space 14 are shown in FIG. 3a. Herein, the depth Tc of a space 14 satisfying the above relationships is the same as in the spaces 14 differing in diameter each shown in FIGS. 3b and 3c.

On joining of resin substrates 10 and 20, the base end 12a of the protrusion 12 of the resin substrate 10 is allowed to be a border, and then a jig D is brought into contact with the surface of the resin substrate 10 of the outside from the base end 12a. Therefore, the jig makes no contact with the protrusion 12. Since the jig D makes no contact with the protrusion 12, the deformation amount 8 of the base end side edge 13a of the through-hole 13 is a minimal value with respect to the depth Ta of the flow channel groove 11. Therefore, on joining of the resin substrates 10 and 20, the flow channel groove 11 is not crushed by a deformed base end side edge 13a of the through-hole 13. Further, the end edge 14a of the space 14 is joined to the resin substrate 20 and then occurrence of an unjoined portion can be prevented.

Figure 3B:
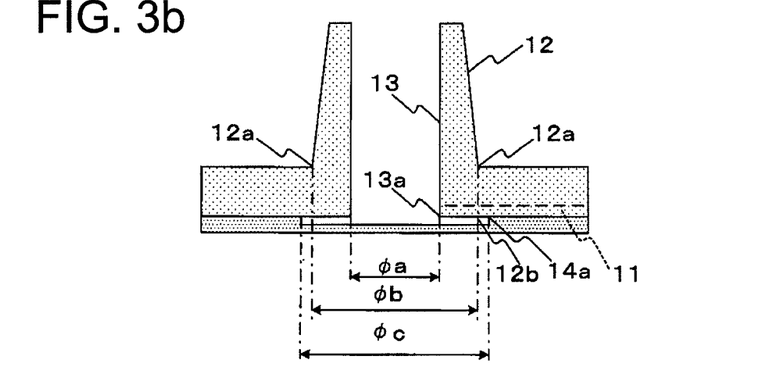
FIG. 3B is a cross-sectional view in the case where the microchip according to the second embodiment of this invention is cut along the center of a through-hole and a view in which the shapes of the spaces each are allowed to differ.
Figure 3C:
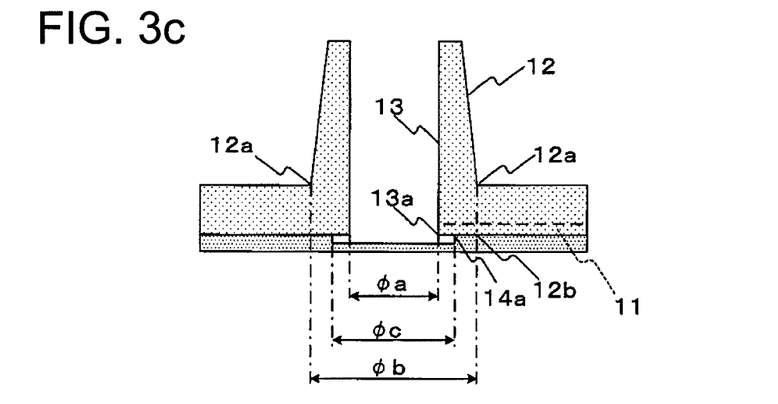
FIG. 3C is a cross-sectional view in the case where the microchip according to the second embodiment of this invention is cut along the center of a through-hole and a view in which the shapes of the spaces each are allowed to differ.

Incidentally, in the case of joining of a resin substrate 10 having a space 14 shown in FIG. 3b satisfying the relationship of $2.5 \times \phi b > \phi c$ and a resin substrate 20, a jig D may be pressed even to the outer circumference of the base end 12a of the protrusion 12 or may be pressed so as to make contact with the surface of the resin substrate 10 corresponding to the outside from the end edge 14a of the space 14.

Third Embodiment

Figure 4A:
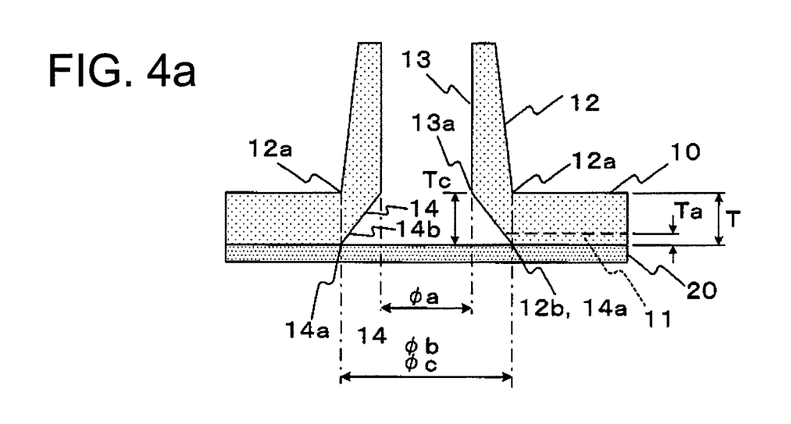
FIG. 4A is a cross-sectional view in the case where the microchip according to the third embodiment of this invention is cut along the center of a through-hole and a view in which the shapes of the spaces each are allowed to differ.
Figure 4B:
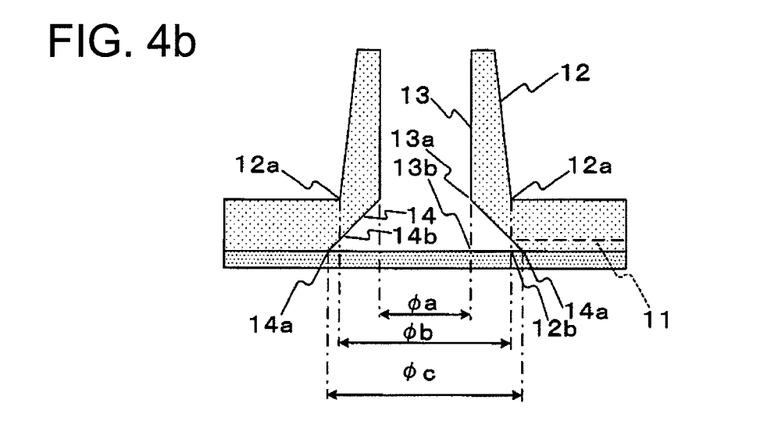
FIG. 4B is a cross-sectional view in the case where the microchip according to the third embodiment of this invention is cut along the center of a through-hole and a view in which the shapes of the spaces each are allowed to differ.
Figure 4C:
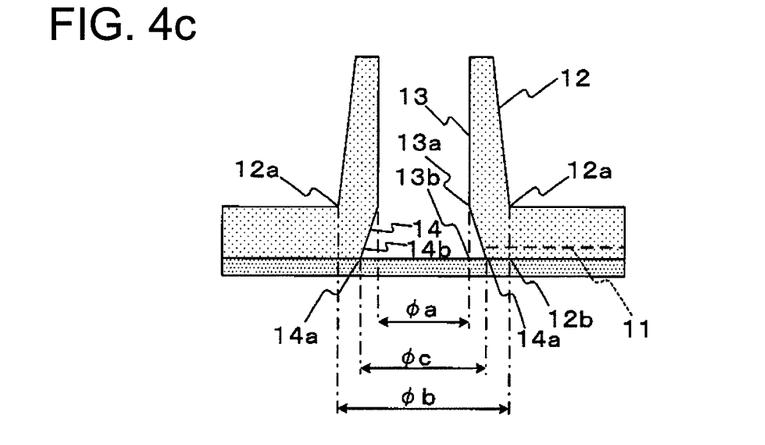
FIG. 4C is a cross-sectional view in the case where the microchip according to the third embodiment of this invention is cut along the center of a through-hole and a view in which the shapes of the spaces each are allowed to differ.

A microchip according to the third embodiment of this invention will now be described with reference to FIG. 4. FIGS. 4a-4c are cross-sectional views in the case where a microchip is cut along the center of the through-hole and views in which the shapes of the spaces each are allowed to differ.

Points in which the constitution of the microchip according to the third embodiment differs from that of the first embodiment will be mainly described. Description on the same points as in the first embodiment will be omitted. In the third embodiment, a space 14 is provided for a resin substrate 20 in which a flow channel groove 11 is formed.

The space 14 has a peripheral wall face 14b slanting from the end edge 14a side of the space 14 toward the base end side edge 13a of the through-hole 13. The diameter of the base end side edge 13b of the through-hole 13 in the case where the base end side edge 13a of the through-hole 13 is projected on the joint face is designated as $\phi a$. And, when the diameter of the end edge 14a side of the space 14 making contact with the joint face is designated as $\phi c$, the relationship of $\phi c > \phi a$ is satisfied. Further, when the diameter of the base end 12b of the protrusion 12 in the case where the base end 12a of the protrusion 12 is projected on the joint face is designated as $\phi b$, the relationship of $\phi b \geq \phi c$ is satisfied. From the above description, the diameter $\phi c$ of end edge 14a side of the space 14 satisfies the relationship of $\phi b \geq \phi c > \phi a$. A space 14 satisfying the relationship of $\phi b = \phi c$ is shown in FIG. 4a. A space 14 satisfying the relationship of $\phi b > \phi c > \phi a$ is shown in FIG. 4C.

When the plate thickness of the resin substrate 10 is designated as T, the depth of the space 14 is designated as Tc, and the depth of the flow channel groove 11 is designated as Ta, respectively, the space 14 preferably maintains the relationship of $Ta < Tc \leq T$ from the viewpoint of prevention of the strength decrease of the resin substrate 20. Spaces 14 satisfying the relationship of Tc=T are shown in FIGS. 4a-4c. Herein, the depth Tc of the space 14 satisfying the above relationship is the same as in the spaces 14 differing in diameter each shown in FIGS. 4b and 4c.

Fourth Embodiment

Figure 5A:
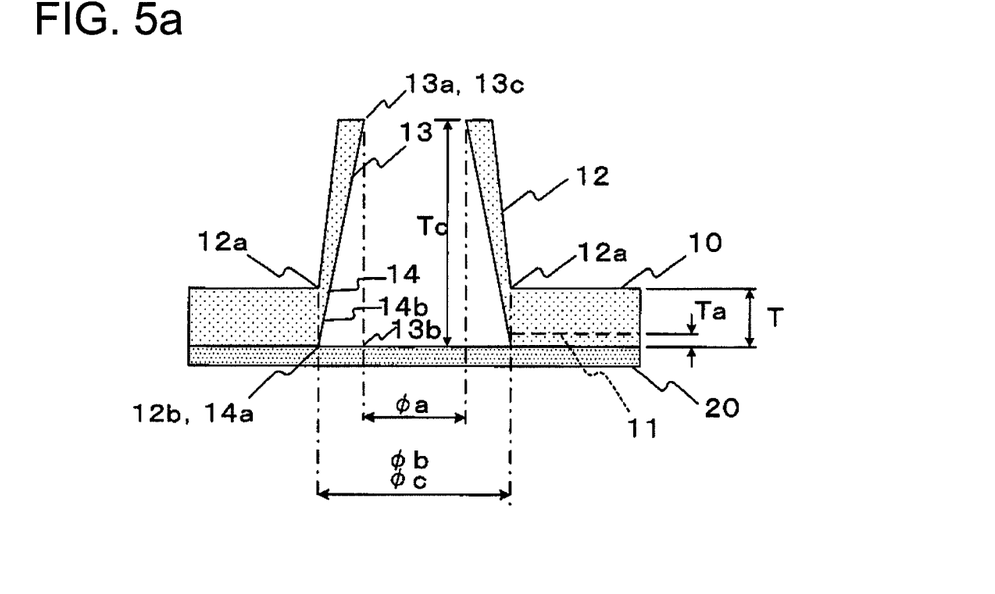
FIG. 5A is a cross-sectional view in the case where the microchip according to the fourth embodiment of this invention is cut along the center of a through-hole and a view in which the shapes of the spaces each are allowed to differ.
Figure 5B:
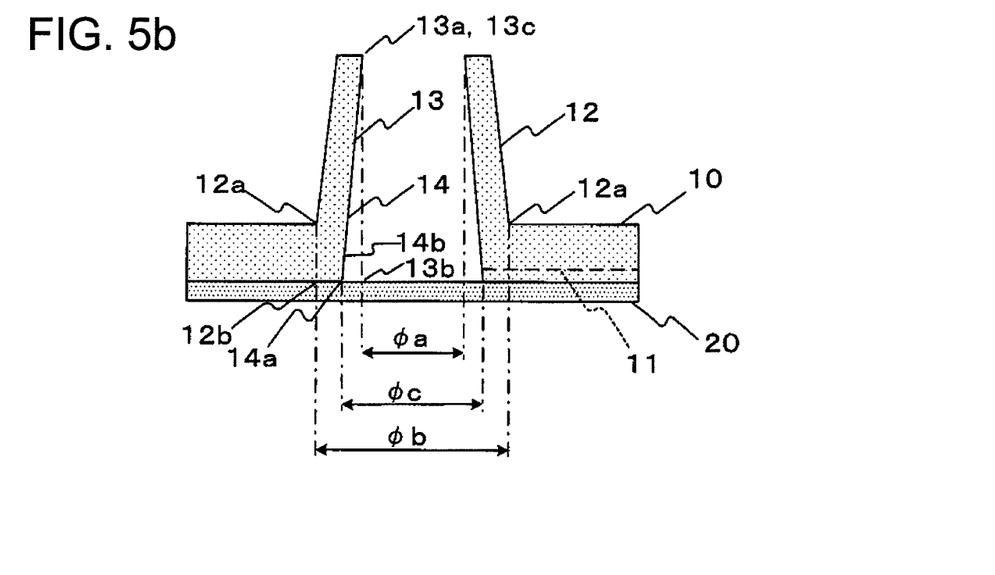
FIG. 5B is a cross-sectional view in the case where the microchip according to the fourth embodiment of this invention is cut along the center of a through-hole and a view in which the shapes of the spaces each are allowed to differ.

A microchip according to the fourth embodiment of this invention will now be described with reference to FIG. 5. FIGS. 5a and 5b are cross-sectional views in the case where a microchip is cut along the center of the through-hole and views in which the shapes of the spaces each are allowed to differ.

Points in which the constitution of the microchip according to the fourth embodiment differs from that of the first embodiment will be mainly described. Description on the same points as in the first embodiment will be omitted. In the fourth embodiment, a space 14 is provided for a resin substrate 20 in which a flow channel groove 11 is formed.

The space 14 has a peripheral wall face 14b slanting from the end edge 14a side of the space 14 toward the tip side edge 13c of the through-hole 13. In this case, the tip side edge 13c of the through-hole 13 is also the base end side edge 13a of the through-hole 13. Therefore, the diameter of the base end side edge 13b side of the through-hole 13 in the case where the tip side edge 13c of the through-hole 13 is projected on the joint face is designated as $\phi a$.

When the diameter of the end edge 14a side of the space 14 making contact with the joint face is designated as $\phi c$, the relationship of $\phi c > \phi a$ is satisfied. Further, the diameter of the base end 12a side of the protrusion 12 in the case where the base end 12a of the protrusion 12 is projected on the joint face is designated as $\phi b$, the relationship of $\phi b \geq c$ is satisfied. From the above description, the diameter $\phi c$ of the end edge 14a side of the space 14 satisfies the relationship of $\phi b \geq \phi c > \phi a$.

The space 14 preferably satisfies the relationship of $\phi b \geq \phi c$ from the viewpoint of prevention of the strength decrease of the resin substrate 20. A space 14 satisfying the relationship of $\phi b = \phi c$ is shown in FIG. 5a. Further, a space satisfying the relationship of $\phi b > \phi c > \phi a$ is shown in FIG. 5b.

The plate thickness of the resin substrate 10 is designated as T, the depth of the space 14 is designated as Tc, and the depth of the through-hole is designated as Td, respectively, the space 14 satisfies the relationship of $T < Tc \leq Td$. Spaces 14 satisfying the relationship of Tc=Td are shown in FIGS. 5a and 5b.

EXAMPLES

Specific examples of the above embodiments will now be described.

(Resin Substrates)

Using an injection molding machine, an acrylic resin (ACRYPLEN, produced by Mitsubishi Rayon Co., Ltd.) of a transparent resin material was molded to produce a resin substrate of the flow channel side in which a plurality of flow channel grooves and a plurality of through-holes and protrusions were formed. This resin substrate of the flow channel side corresponds to one example of the resin substrates 10 in the above embodiments in which a flow channel groove 11, a protrusion 12, and a through-hole 13 are formed.

The dimension of the resin substrate of the flow channel side is listed below.

Length of one side=50 mm

Thickness=1 mm

Width and depth of the flow channel groove 11=50 μm

Further, using an acrylic resin as a transparent material, a resin substrate of the cover side was produced in which the thickness of the substrate was 75 μm and the length of one side was 50 mm. This resin substrate of the cover side corresponds to the resin substrate 20 in the above embodiments.

(Joining)

Subsequently, the surface in which the flow channel grooves were formed was place inward to stack the resin substrate of the flow channel side and the resin substrate of the cover side. In this state, the two resin substrates were nipped by a jig D and then a pressure of 1 kg/cm² was applied with heating at 90° C., followed by being kept for 1 minute to produce a microchip.

On joining of the resin substrates 10 and 20, the base end 12a of the protrusion 12 was allowed to be the border and the jig D was brought into contact with the surface of the outside from the base end 12a (on the opposite side to the center of the protrusion 12). Therefore, the jig makes no contact with the protrusions 12. This joining method is the same as for produced microchips according to Example 1-Example 6 and Comparative Example 1.

Figure 6:
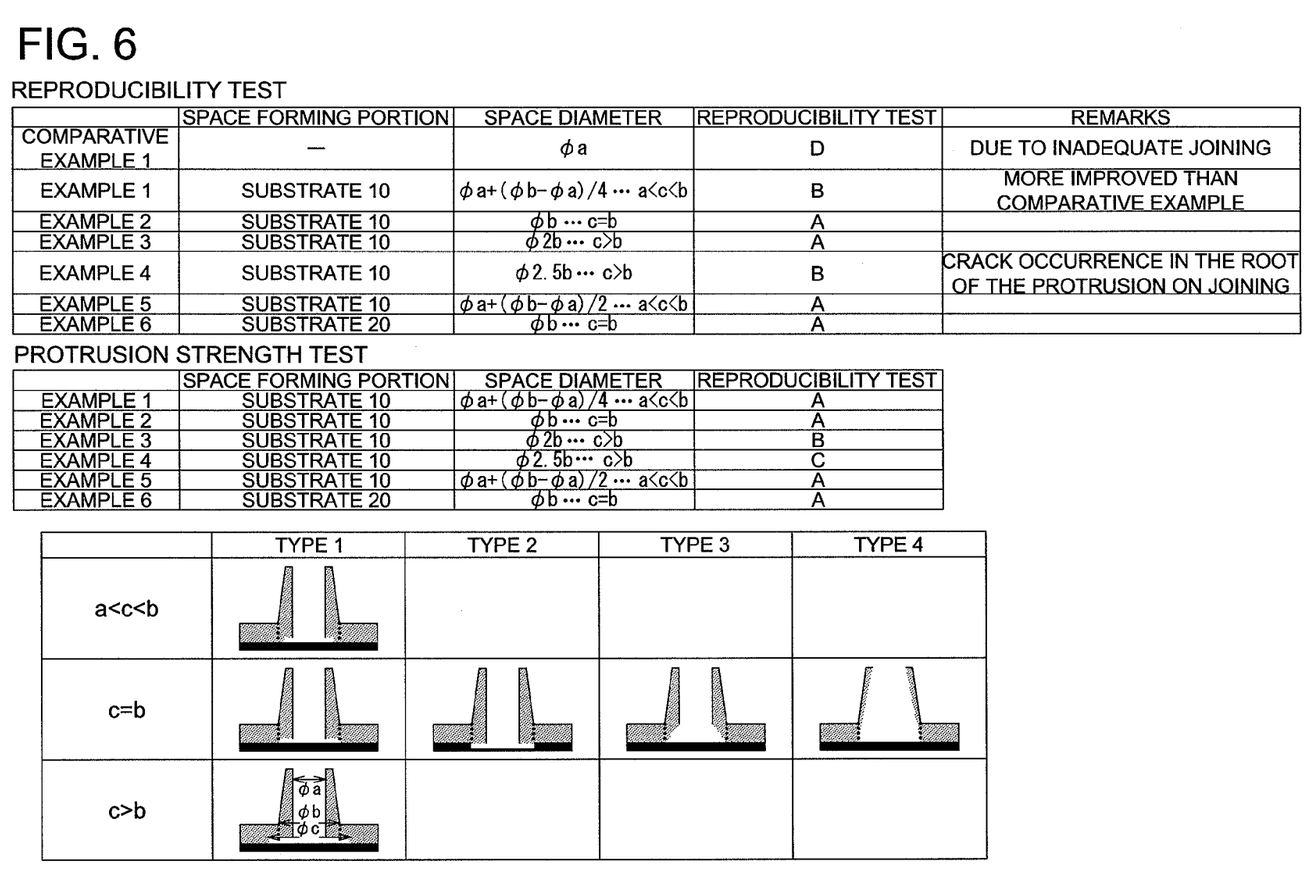
FIG. 6 is a figure tabulating the test results of microchips.

Resin substrates of the flow channel side in which the value of each space 14 was changed were produced to produce microchips. The results of Example 1-Example 6 and Comparative Example 1 are shown in the table of FIG. 6. Herein, in Example 1-Example 6 and Comparative Example 1, the depth Tc of the space 14 and the depth Ta of the flow channel groove 11 satisfy the relationship of Ta=Tc.

In Example 1-Example 6, the diameter $\phi a$ of the base end side of the through-hole 13, the diameter $\phi b$ of the base end side of the protrusion, and the diameter $\phi c$ of the end edge side of the space 14 satisfy the relationship of $\phi a < \phi c$.

For example, in Example 1, in a resin substrate 10, a space of the value of $\phi a + (\phi b - \phi a)/4$ was formed and then a resin substrate 20 of 75 μm made of ACRYPLEN (produced by Mitsubishi Rayon Co., Ltd.) was subjected to thermocompression bonding thereto.

Further, in Example 2, in a resin substrate 10, a space of $\phi b$ was formed and then a resin substrate 20 of 75 μm made of ACRYPLEN (produced by Mitsubishi Rayon Co., Ltd.) was subjected to thermocompression bonding thereto.

In Example 3, in a resin substrate 10, a space of $2 \times \phi b$ was formed and then a resin substrate 20 of 75 μm made of ACRYPLEN (produced by Mitsubishi Rayon Co., Ltd.) was subjected to thermocompression bonding thereto.

In Example 4, in a resin substrate 10, a space of $2.5 \times \phi b$ was formed and then a resin substrate 20 of 75 μm made of ACRYPLEN (produced by Mitsubishi Rayon Co., Ltd.) was subjected to thermocompression bonding thereto.

In Example 5, in a resin substrate 10, a space of the value of $\phi a + (\phi b - \phi a)/2$ was formed and then a resin substrate 20 of 75 μm made of ACRYPLEN (produced by Mitsubishi Rayon Co., Ltd.) was subjected to thermocompression bonding thereto.

Furthermore, in Example 6, a resin substrate 20 of 75 μm made of ACRYPLEN (produced by Mitsubishi Rayon Co., Ltd.) was pressed by a die while heated at 80° C. to form a space of 4b, followed by thermocompression bonding to a resin substrate 10 with no space.

On the other hand, in Comparative Example 1, a resin substrate with no space and a resin substrate 20 of 75 μm made of ACRYPLEN (produced by Mitsubishi Rayon Co., Ltd.) were subjected to thermocompression bonding.

As described above, in Example 1-Example 3, Example 5, and Example 6, the diameter $\phi c$ of the space satisfies the relationship of $\phi a < \phi c < 2.5 \times \phi b$, and in Example 4, the relationship of $\phi c < 2.5 \times \phi b$ is not satisfied.

(Evaluation)

Then, with respect to Example 1-Example 6, the reproducibility of a microchip which is the effect of this invention was evaluated. Samples produced under the same conditions were evaluated 3 times and the evaluation therefor was made based on the average value.

(Reproducibility Test)

Ten μl of pure water was placed into the flow channel groove of a produced sample as shown in FIG. 6 and then using a syringe, a pressure of 0.1 MPa was applied. The time lag until the pure water reached the protrusion of the opposite side after the pressure had been applied was measured.

In the table of FIG. 6, "D" represents a lag of at least 1 second, "C" represents a lag of at most 1 second, "B" represents a lag of at most 0.5 second, and "A" represents a lag of at most 0.1 second.

In Example 1-Example 6, the time lag was able to be confirmed to be at most 1 second. The samples according to Example 1-Example 6 were considered to exhibit adequate reproducibility since in the joint face, no unjoined portion was generated.

Further, the comparative example was confirmed to show a time lag of at least 1 second. The sample according to Comparative Example 1 was considered to exhibit inadequate reproducibility since in periphery of the base end side edge of the through-hole, an unjoined portion was generated.

Still further, with respect to Example 1-Example 6, the strength of a microchip was evaluated. Also in strength test, in the same manner as in the reproducibility test, evaluation was conducted 3 times for samples produced under the same conditions.

(Strength Test)

Using a small press machine (produced by AS ONE Corp.), the protrusion upper portion was applied with a pressure of 3 kN to examine the deformation state of a sample.

In the table of FIG. 6, "C" represents that in the 3 tests, in any one sample, minute cracks which were non-problematic in use were generated, "B" represents that in the 3 tests, in any one sample, the base end (the root) of the protrusion deformed and slight deformation remained after termination of pressurization, and "A" represents that in the 3 tests, in every sample, although the base end of the protrusion deformed via pressurization, no deformation remained at all after termination of pressurization.

In Example 1, Example 2, Example 5, and Example 6, no deformation remained at all after termination of pressurization and excellent strength was expressed. In this manner, the samples according to Example 1-Example 3, Example 5, and Example 6 were able to be confirmed to exhibit adequate strength.

In Example 3, even after pressurization was terminated, the base end (the root) of the protrusion was slightly deformed in some cases. In Example 4, although no problem was produced in use, minute cracks were generated in the base end (the root) of the protrusion in some cases.

SUMMARY

In the sample produced in Comparative Example 1, the result of the reproducibility test was poor and also the values for the 3 samples differ from each other. The reason is thought as follows: an unjoined portion was generated in the base end (the root) of the protrusion or a portion which had been inadequately bonded was separated via pressurization, whereby a non-uniform flow was created. Contrary thereto, each sample of the present invention exhibited excellent reproducibility, and a space especially satisfying the relationship of $\phi a + (\phi b - \phi a)/2 \leq \phi c$ was more preferable. The sample produced in Example 4 was non-problematic in use, but the space was large and the base end of the protrusion was relatively fragile, whereby minute cracks were generated when the sample was pressed from the top and bottom. From the above description, the space more preferably falls within the range of $\phi a + (\phi b - \phi a)/2 \leq 2.5 \times \phi c$.

Incidentally, the material and dimension of each of the resin substrates shown in above Examples are just one example, and this invention is not limited thereto. For example, in above Examples, the almost circularly cross-sectional shape of the space 14 was allowed to be the same shape in the depth direction. It is possible that the diameter of the almost circularly cross-sectional shape of the space 14 is gradually decreased in the depth direction to provide a peripheral wall face slanting from the end edge 14a side of the space 14 toward the base end side edge 13a of the through-hole 13. Further, a peripheral wall face slanting from the end edge 14a side of the space 14 toward the tip side edge 13c of the through-hole 13 may be provided. Still further, even when any of the resins cited in the above embodiments is used, the same results as in Examples are obtained.

DESCRIPTION OF THE SYMBOLS

10: resin substrate
11: flow channel groove
12: protrusion
12a: base end
12b: the base end of a protrusion when projected to the joint face
13: through-hole
13a: base end side edge
13b: the base end side edge of a through-hole when projected to the joint face
13c: tip side edge
14: space
14a: end edge
20: resin substrate

What is claimed is:

1. A microchip comprising:
a plurality of resin substrates;
a flow channel groove formed in a surface of at least one resin substrate of the plurality of resin substrates, the plurality of resin substrates being joined with a face facing inward where the flow channel groove is formed, and at least one resin substrate of the plurality of resin substrates having formed therein a through-hole of an almost circularly cross-sectional shape leading to the flow channel groove from a face of an opposite side to the face where the plurality of resin substrates are joined; and
a protrusion, in the face of the opposite side, protruding in a thickness direction of the at least one resin substrate and integrally formed with the at least one resin substrate so as to surround the through-hole;
wherein the microchip in which a space having an almost circularly cross-sectional shape concentric with the through-hole and a depth in the same direction as the thickness direction of the at least one resin substrate is formed on a joint face of the at least one resin substrate or another resin substrate of the plurality of resin substrates which is the joint face where the protrusion is projected from an almost perpendicular direction to the joint face;
wherein, when a base end side edge of the through-hole is projected on the joint face from the almost perpendicular direction, a relationship of $\phi c > \phi a$ is satisfied and a relationship of $\phi c \geq \phi b$ is satisfied, provided that a diameter of the base end side of the through-hole is designated as $\phi a$, a diameter of the based end of the protrusion where the base end of the protrusion is projected on the joint face from the almost perpendicular direction is designated as $\phi b$ and a diameter of an end edge side of the space making contact with the joint face is designated as $\phi c$;
wherein the space is formed in the joint face of the plurality of resin substrates in which the flow channel groove has been formed in the at least one resin substrate of the plurality of resin substrates;
wherein the space has a peripheral wall face slanting from the end edge side of the space toward the base end side edge of the through-hole or a tip side edge of the through-hole; and
wherein the microchip further satisfies the relationship of $T \leq Tc \leq Td$, provided that the depth of the space is designated as Tc, the thickness of the at least one resin substrate is designated as T, and the depth of the through-hole is designated as Td, respectively.

2. The microchip of claim 1, wherein the microchip further satisfies a relationship of $2.5 \times \phi b > \phi c$.

3. The microchip of claim 1, wherein the depth of the space is such that a clearance remains between the base end side edge of the through-hole and the joint face even when the plurality of resin substrates is joined.

4. The microchip of claim 3, wherein the microchip further satisfies the relationship of $Ta \leq Tc$, provided that the depth of the flow channel groove is designated as Ta.

5. The microchip of claim 3, wherein the tip side edge of the through hole is the base side edge of the through-hole and is at the tip of the protrusion surrounding an aperture.

* * * * *